United States Patent
Robertson et al.

(10) Patent No.: US 10,673,901 B2
(45) Date of Patent: Jun. 2, 2020

(54) CRYPTOGRAPHIC SECURITY AUDIT USING NETWORK SERVICE ZONE LOCKING

(71) Applicant: Cisco Technology, Inc., San Jose, CA (US)

(72) Inventors: Matthew Scott Robertson, Santa Clara, CA (US); David McGrew, Poolesville, MD (US); Timothy David Keanini, Austin, TX (US); Sunil Amin, Atlanta, GA (US); Ellie Marie Daw, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 217 days.

(21) Appl. No.: 15/854,879

(22) Filed: Dec. 27, 2017

(65) Prior Publication Data
US 2019/0199753 A1 Jun. 27, 2019

(51) Int. Cl.
*H04L 29/06* (2006.01)
*H04L 9/08* (2006.01)
*H04L 9/32* (2006.01)
*H04L 9/06* (2006.01)

(52) U.S. Cl.
CPC .............. *H04L 63/20* (2013.01); *H04L 9/088* (2013.01); *H04L 9/0825* (2013.01); *H04L 9/0844* (2013.01); *H04L 9/3268* (2013.01); *H04L 63/105* (2013.01); *H04L 9/0643* (2013.01)

(58) Field of Classification Search
CPC combination set(s) only.
See application file for complete search history.

(56) References Cited

U.S. PATENT DOCUMENTS

| | | | |
|---|---|---|---|
| 7,644,151 B2 | 1/2010 | Jerrim et al. | |
| 7,886,358 B2 | 2/2011 | Copeland, III | |
| 8,074,267 B1 * | 12/2011 | Stimpson | H04L 63/0471 713/151 |
| 9,288,234 B2 * | 3/2016 | Barr | H04L 63/20 |
| 9,699,202 B2 | 7/2017 | McGrew et al. | |
| 2003/0093692 A1 | 5/2003 | Porras | |

(Continued)

OTHER PUBLICATIONS

Joe Buchanan "Automate "Known Bad Hosts" detection Lancop"; https://www.lancope.com/blog/automate-known-bad-hosts-detection; Sep. 10, 2009; pp. 1-5.

(Continued)

*Primary Examiner* — Malcolm Cribbs
(74) *Attorney, Agent, or Firm* — Behmke Innovation Group LLC; James M. Behmke; Jonathon P. Western

(57) ABSTRACT

In one embodiment, a service receives captured traffic flow data regarding a traffic flow sent via a network between a first device assigned to a first network zone and a second device assigned to a second network zone. The service identifies, from the captured traffic flow data, one or more cryptographic parameters of the traffic flow. The service determines whether the one or more cryptographic parameters of the traffic flow satisfy an inter-zone policy associated with the first and second network zones. The service causes performance of a mitigation action in the network when the one or more cryptographic parameters of the traffic flow do not satisfy the inter-zone policy associated with the first and second network zones.

20 Claims, 9 Drawing Sheets

(56) References Cited

U.S. PATENT DOCUMENTS

| | | | |
|---|---|---|---|
| 2003/0204748 A1* | 10/2003 | Chiu | H04L 63/0428 726/3 |
| 2007/0157286 A1* | 7/2007 | Singh | H04L 41/0866 726/1 |
| 2010/0043067 A1* | 2/2010 | Varadhan | H04L 12/18 726/13 |
| 2010/0043068 A1* | 2/2010 | Varadhan | H04L 12/4633 726/15 |
| 2011/0173441 A1* | 7/2011 | Bagepalli | H04L 63/166 713/153 |
| 2012/0148044 A1* | 6/2012 | Fang | H04L 63/0428 380/255 |
| 2013/0019277 A1* | 1/2013 | Chang | H04L 63/0218 726/1 |
| 2013/0148659 A1* | 6/2013 | Shukla | H04L 61/6045 370/390 |
| 2014/0196108 A1* | 7/2014 | Barr | H04L 63/205 726/1 |
| 2014/0331274 A1* | 11/2014 | Bitton | H04L 3/1408 726/1 |
| 2015/0365440 A1* | 12/2015 | Billau | H04L 63/20 726/1 |
| 2016/0080417 A1 | 3/2016 | Thomas et al. | |
| 2017/0013000 A1 | 1/2017 | El-Moussa et al. | |
| 2017/0201810 A1 | 7/2017 | Anderson et al. | |
| 2019/0104144 A1* | 4/2019 | Robertson | H04L 63/1425 |

OTHER PUBLICATIONS

"NSS Labs Predicts 75% of Web Traffic Will Be Encrypted by 2019—NS . . . " ttps://www.nsslabs.com/company/news/press-releases/nss-labs-predicts . . . ; Nov. 9, 2016; pp. 1-3.

* cited by examiner

CRYPTOGRAPHIC SECURITY AUDIT USING NETWORK SERVICE ZONE LOCKING

TECHNICAL FIELD

The present disclosure relates generally to computer networks, and, more particularly, to cryptographic security audit using network service zone locking.

BACKGROUND

The volume and variety of application traffic in many networks is ever increasing, thus complicating the task of implementing network security policies in a network. For example, a given application executing on an endpoint device in the network may send traffic to a corresponding application server, which may or may not be allowed by network policy. Notably, factors such as the identity of the device, the user of the device, the application, server information, and the like, may dictate whether the traffic is permitted to traverse the network.

Coinciding with the rapid increase in the volume and variety of application traffic is the rapid proliferation and use of cryptographic techniques with respect to network traffic. Notably, in recent years, the percentage of web traffic that is encrypted has almost doubled each year, to the point that the majority of web traffic now uses some form of encryption. However, from a network security standpoint, the complexity of the various cryptographic protocols and standards makes it extremely difficult for system developers and administrators to understand the actual security levels achieved by real-world systems.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
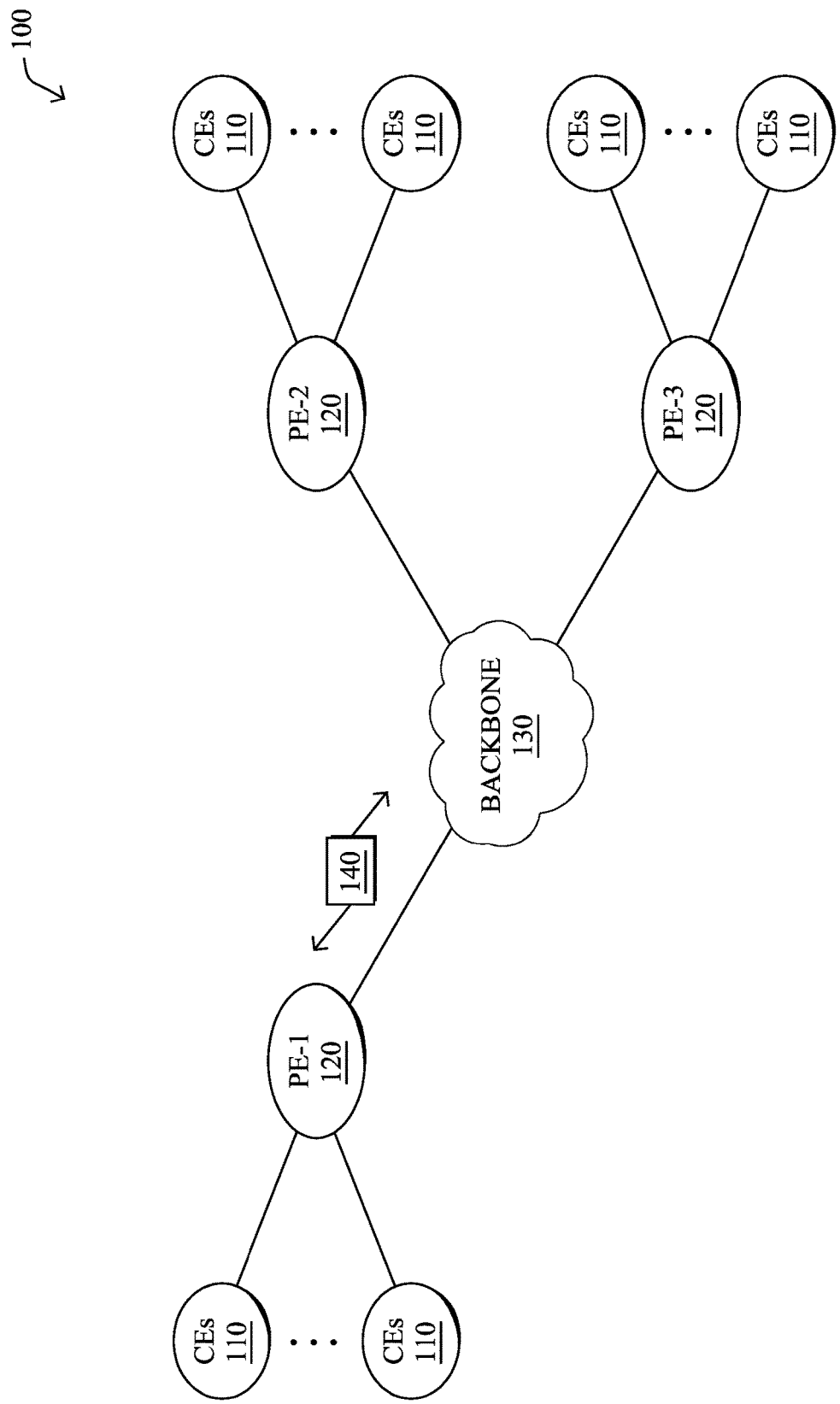
FIGS. 1A-1B illustrate an example communication network.

According to one or more embodiments of the disclosure, a service receives captured traffic flow data regarding a traffic flow sent via a network between a first device assigned to a first network zone and a second device assigned to a second network zone. The service identifies, from the captured traffic flow data, one or more cryptographic parameters of the traffic flow. The service determines whether the one or more cryptographic parameters of the traffic flow satisfy an inter-zone policy associated with the first and second network zones. The service causes performance of a mitigation action in the network when the one or more cryptographic parameters of the traffic flow do not satisfy the inter-zone policy associated with the first and second network zones.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate net81work node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
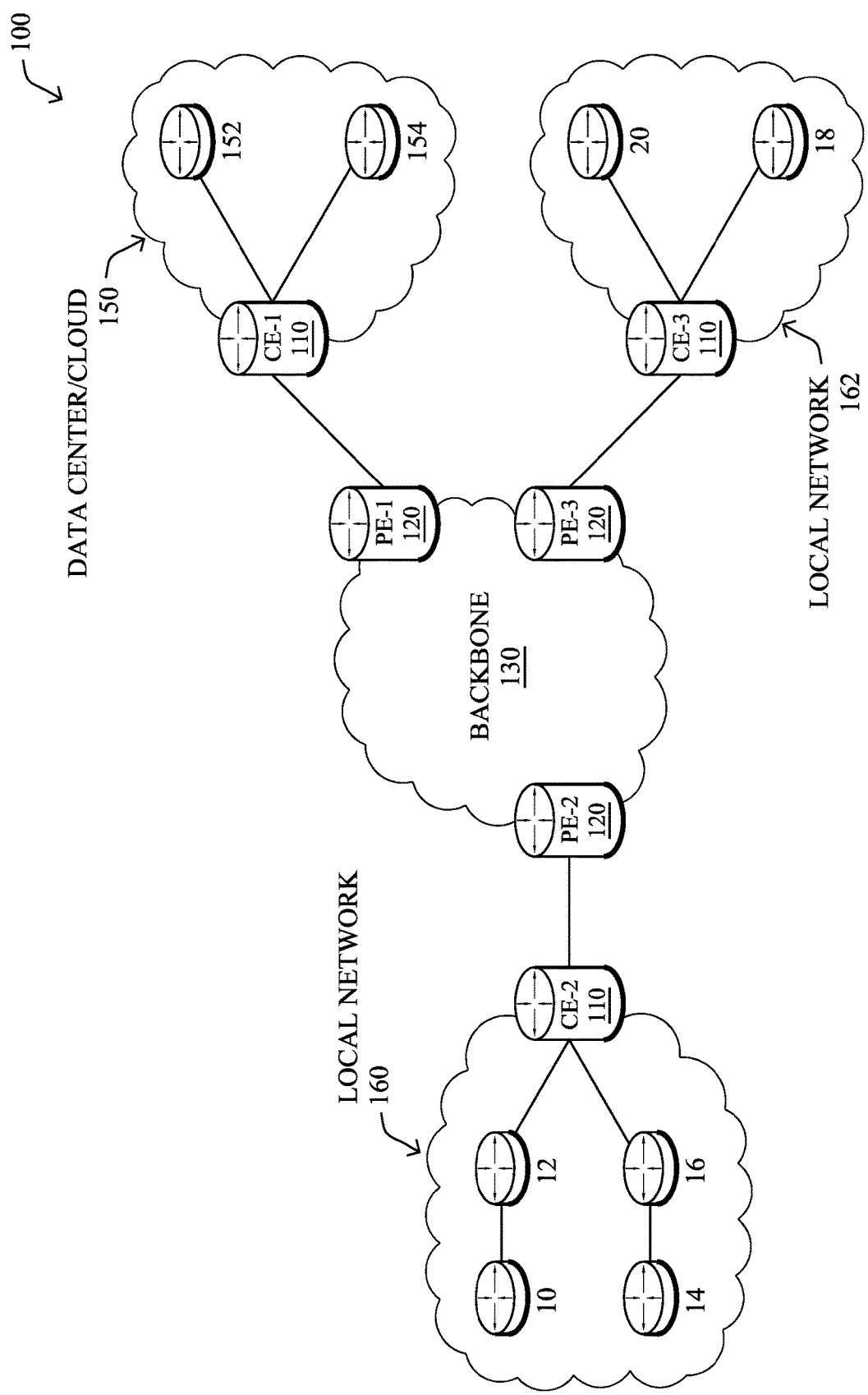

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
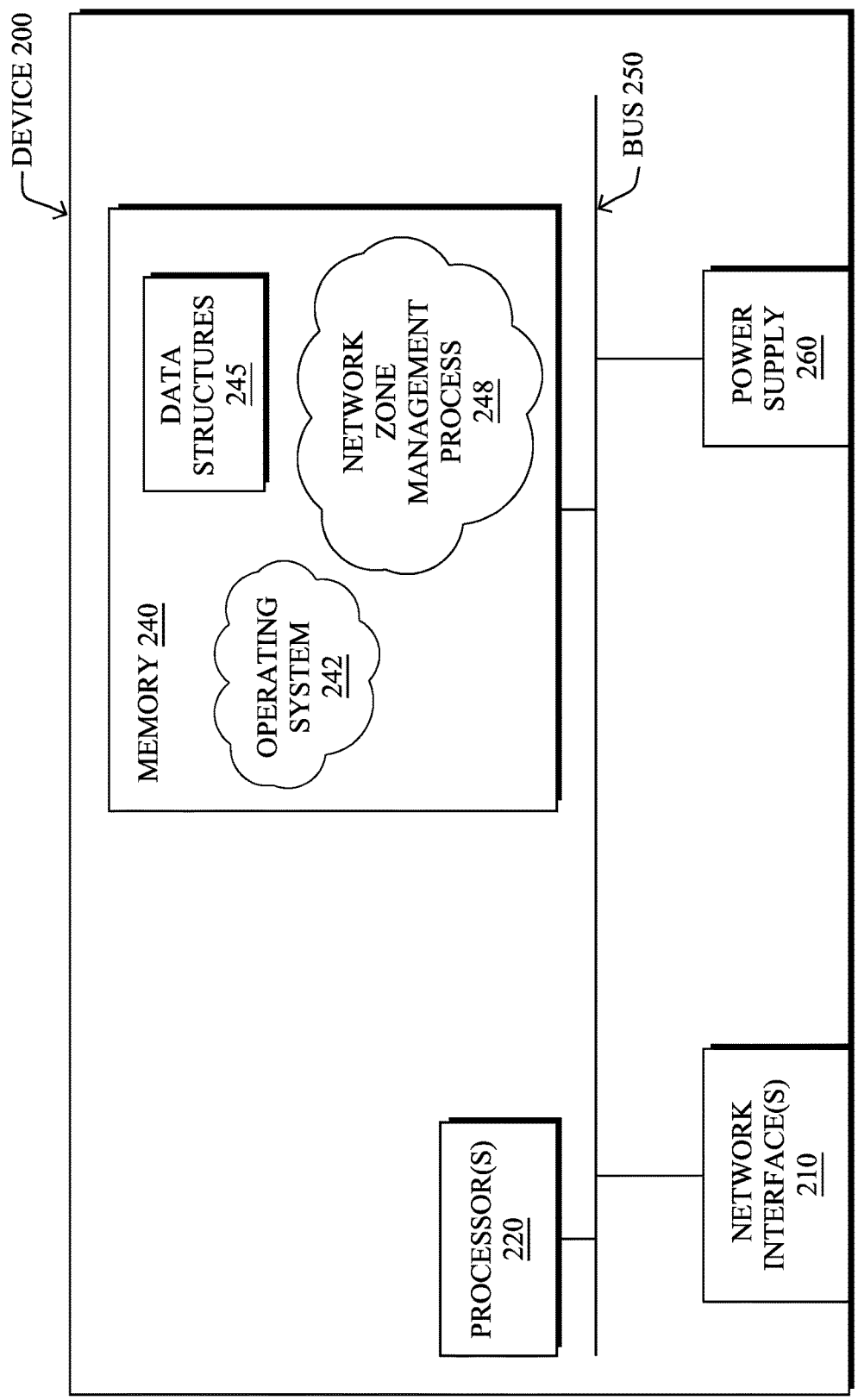
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network zone management process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, cryptography is foundational to the security of modern information systems, yet the complexity of protocols and standards such as Transport Layer Security (TLS) and the Internet Engineering Task Force's (IETF's) public-key infrastructure (PKIX), make it extremely difficult for system developers and administrators to understand the actual security levels achieved by real-world systems. Consequently, many organizations struggle to understand if the required level of cryptographic security is being met. For example, while certain traffic in a network may leverage cryptographic techniques, not all cryptographic techniques are equal and some may not be acceptable for certain types of traffic in the network.

Cryptographic Security Audit Using Network Security Zone Locking

The techniques herein introduce a mechanism to develop a policy model that can trigger the performance of a mitigation action upon detection of unacceptable cryptographic communication between different network zones. In some aspects, a zone (or configuration file) may be created based on observed cryptographic properties of traffic in the network. In further aspects, the resulting policy framework can be used by a traffic analytics engine to apply a defined policy to an observed traffic flow between network zones, based on one or more cryptographic parameters of the traffic flow.

Specifically, according to one or more embodiments of the disclosure as described in detail below, a service receives captured traffic flow data regarding a traffic flow sent via a network between a first device assigned to a first network zone and a second device assigned to a second network zone. The service identifies, from the captured traffic flow data, one or more cryptographic parameters of the traffic flow. The service determines whether the one or more cryptographic parameters of the traffic flow satisfy an inter-zone policy associated with the first and second network zones. The service causes performance of a mitigation action in the network when the one or more cryptographic parameters of the traffic flow do not satisfy the inter-zone policy associated with the first and second network zones.

Illustratively, the techniques described herein may be performed by hardware, software, and/or firmware, such as in accordance with the network zone management process 248, which may include computer executable instructions executed by the processor 220 (or independent processor of interfaces 210) to perform functions relating to the techniques described herein.

Operationally, the techniques herein allow for the auditing of a cryptographic security policy using a flow-based, analytics service. Through the collection and analysis of statistics about network flows, including cryptographic protocol information, and the application of defined policies to the cryptographic parameters exhibited by traffic flows in the network, the techniques herein can facilitate the monitoring and auditing of cryptographic usage in the network.

FIGS. 3A-3D illustrate an example service applying a policy to a traffic flow, according to various embodiments. As shown, network 300 may comprise a first device 304 and a second device 306 that are communicatively coupled to one another via network 300. For example, first device 304 may be an endpoint device such as a laptop or desktop computer, a deployed sensor or actuator, a mobile device (e.g., a phone, wearable device, etc.), or the like, that may communicate with second device 306, which may be a server or another endpoint device.

In addition to devices 304-306, network 300 may also include a security service 302 that oversees the operations of devices 304-306 from a security perspective. Notably, security service 302 may be a service implemented by one or more networking devices within network 300 through which traffic associated with device 304 and/or device 306 flow. For example, security service 302 may be implemented by, or across, any number of routers, switches, firewalls, telemetry data exporters (e.g., Netflow or IPFIX exporters), proxies, address translation devices, intrusion detection or prevention systems, or the like.

According to various embodiments, the techniques herein leverage the concept of network zones, for purposes of applying security policies to devices 304-306. For example, Stealthwatch by Cisco Systems, Inc., and similar security mechanisms, allow different devices/entities to be assigned to different network zones. In turn, different security policies may be applied to the devices, based on the network zone to which the device belongs and/or the network zone to which the device is communicating. More specifically, a network zone may be defined as a collection of one or more devices, as represented by their device identifiers, such as their IP addresses.

As shown, security service 302 may assign device 304 to a first network zone 308, based on its IP address in network 300. Similarly, security service 302 may assign device 306 to a second network zone 310 based on its own IP address in network 300. Such assignments may be based on input from a user interface (e.g., a network administrator may assign IP addresses to specific network zones) and/or may be made automatically by security service 302 based on predefined rules (e.g., any IP address outside of the local network is considered part of a different network zone).

In some cases, network zones 308 and 310 may be part of the same LAN or virtual LAN (VLAN). In other cases, network zones 308 and 310 may be on different LANs that communicate in network 300 via a WAN. For example, device 304 may part of a LAN for a business or other entity and device 306 may be a remote server accessible by device 304 via the Internet. In other words, a network zone may be viewed as any grouping of one or more devices, in order to apply a security policy to that grouping.

Figure 3A:
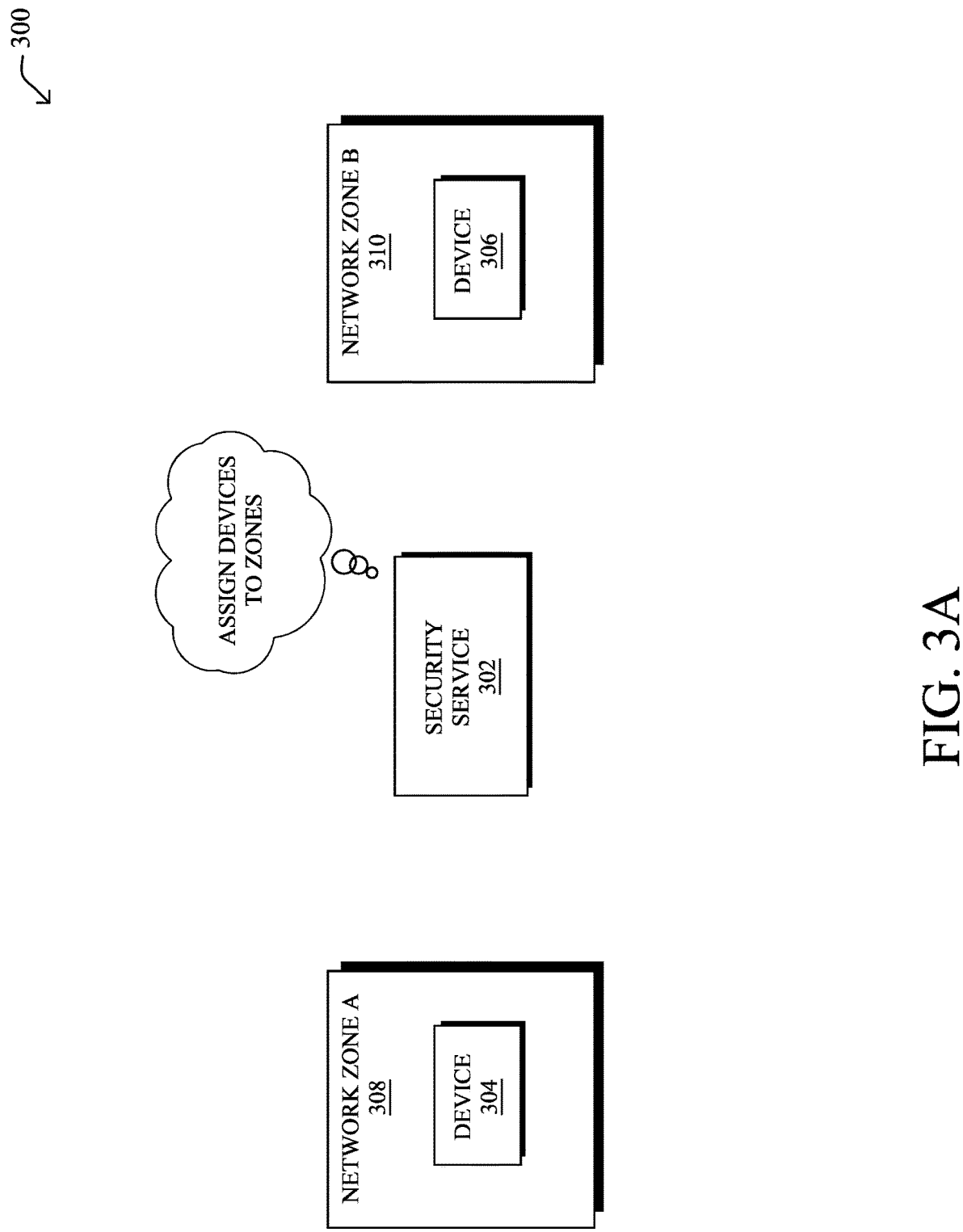
FIGS. 3A-3D illustrate an example service applying a policy to a traffic flow.
Figure 3B:
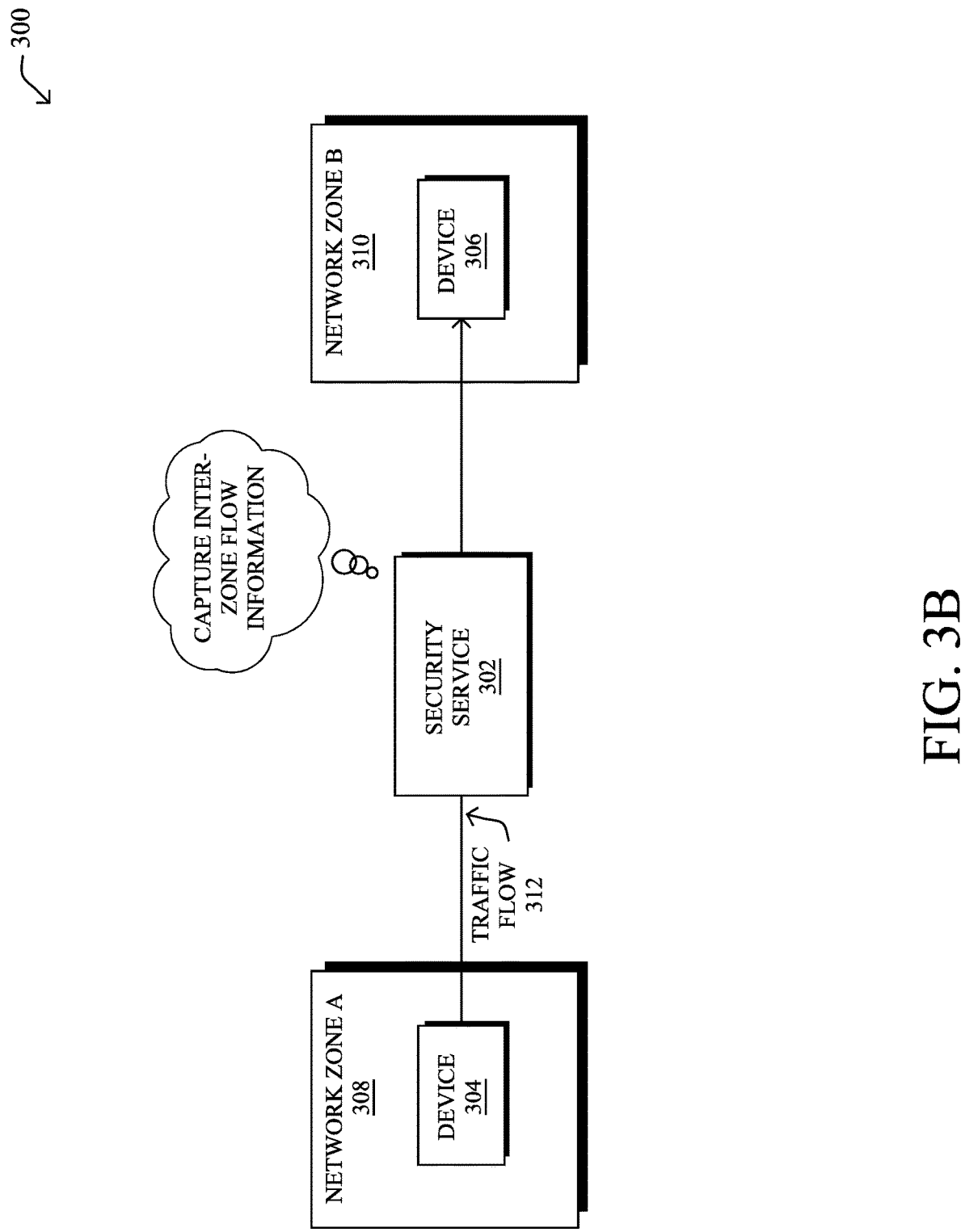

As shown in FIG. 3B, assume that device 304 in network zone 308 initiates a traffic flow 312 with device 306 in network zone 310. In such a case, security service 302 may capture flow information regarding the inter-zone traffic flow 312 between network zones 308 and 310. Security service 302 may leverage any number of telemetry collection mechanisms in network 300, to capture the flow information. For example, any number of network devices along the path of flow 312 may capture telemetry data, such as Netflow and/or IPFIX records, for consumption by security service 302.

In some embodiments, the telemetry source(s) that generate the telemetry data regarding traffic flow 312 may analyze packet headers of packets in flow 312, to capture feature information about the traffic flow. For example, a given router may capture the source address and/or port of device 304, the destination address and/or port of device 306, the protocol(s) used by the packets of traffic flow 312, or other header information by analyzing the header of a packet in traffic flow 312. Example captured flow information may include, but are not limited to, Transport Layer Security (TLS) information (e.g., from a TLS handshake), such as the ciphersuite offered, user agent, TLS extensions, etc., HTTP information (e.g., URI, etc.), Domain Name System (DNS) information, or any other data features that can be extracted from the observed traffic flow(s).

In further embodiments, the capturing telemetry device(s) may also assess the packet payloads of traffic flow 312, if available, to capture information about traffic flow 312. For example, the capturing device may perform deep packet inspection (DPI) on one or more of the packets of flow 312, to assess the contents of the packet. Doing so may, for example, yield additional information that can be used to determine the application associated with the traffic flow (e.g., traffic flow 312 was sent by a web browser of device 304, traffic flow 312 was sent by a videoconferencing application, etc.). However, as would be appreciated, traffic flow 312 may also be encrypted, thus preventing the telemetry device(s) from assessing the actual payload of the packet.

The networking device that captures the flow telemetry data may also compute any number of statistics or metrics regarding traffic flow 312. For example, the capturing device may determine the start time, end time, duration, packet size(s), the distribution of bytes, etc., associated with the traffic flow 312. In further examples, the capturing device may capture sequence of packet lengths and time (SPLT) data regarding traffic flow 312, sequence of application lengths and time (SALT) data regarding traffic flow 312, or byte distribution (BD) data regarding traffic flow 312.

Figure 3C:
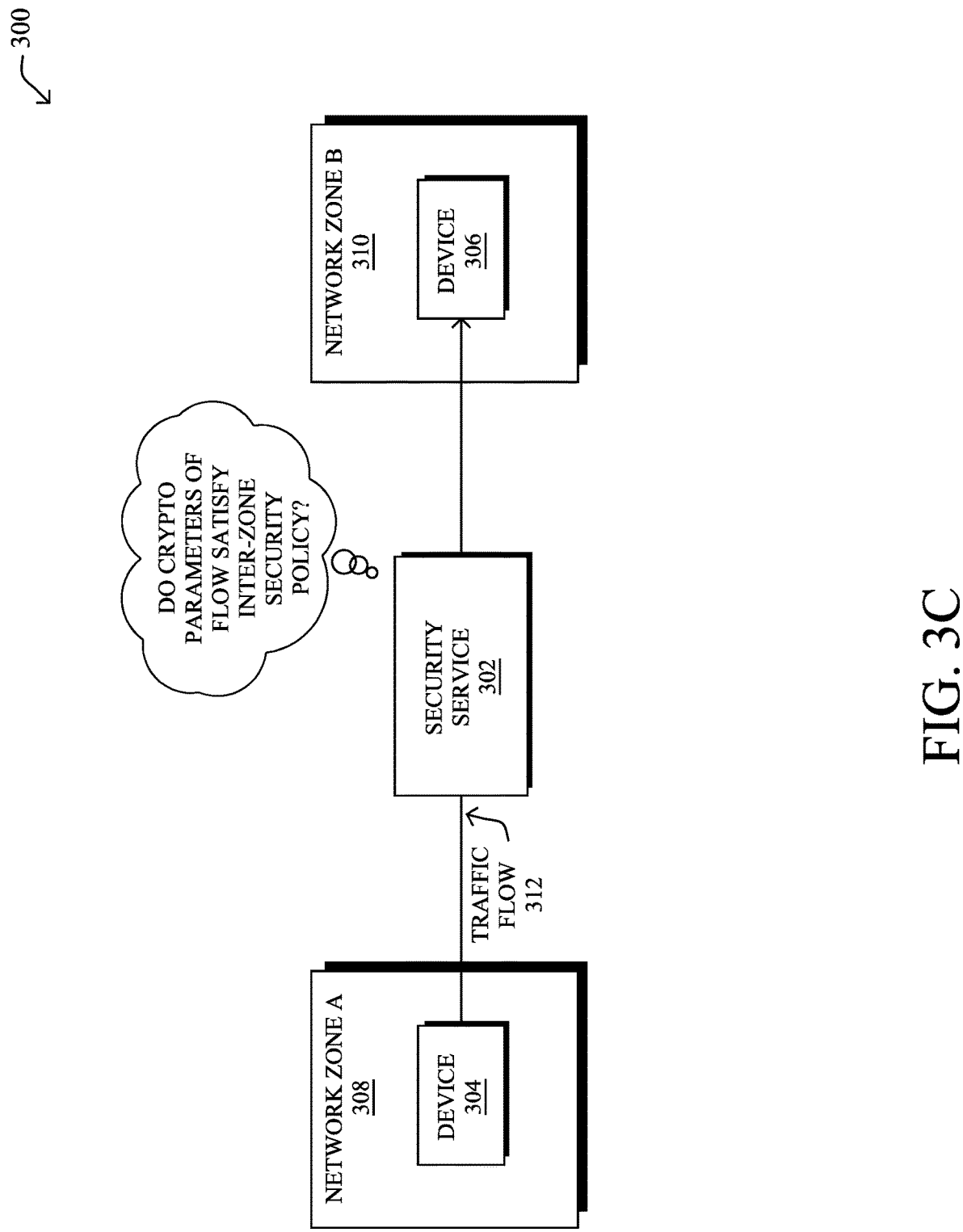

As shown in FIG. 3C, security service 302 may assess the captured flow telemetry information regarding flow 312, to determine whether traffic flow 312 satisfies an inter-zone security policy associated with network zones 308-310. In particular, the techniques herein introduce the notion of inter-zone policies that control which cryptographic parameters of a traffic flow are deemed acceptable by security service 302. For example, as detailed below, security service 302 may assess the type of encryption, key lengths, and/or other encryption parameters of traffic flow 312, to determine whether these parameters are allowed between network zones 308 and 310.

Figure 3D:
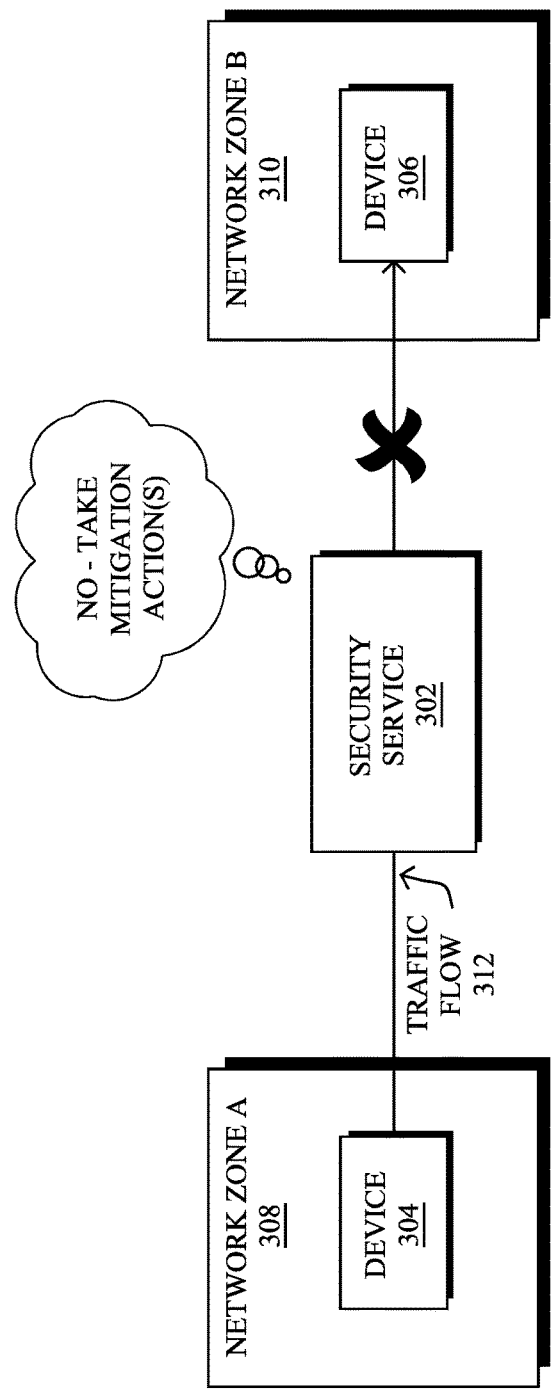

In FIG. 3D, security service 302 may cause the performance of one or more mitigation actions, if the cryptographic parameters of traffic flow 312 do not satisfy the inter-zone policy associated with zones 308-310. For example, if traffic flow 312 does not use an acceptable key length, or if traffic flow 312 does not use encryption at all, security service 302 may block traffic flow 312, generate an alert to an administrator or other system, or take any other mitigation actions specified by the security policy.

Figure 4:
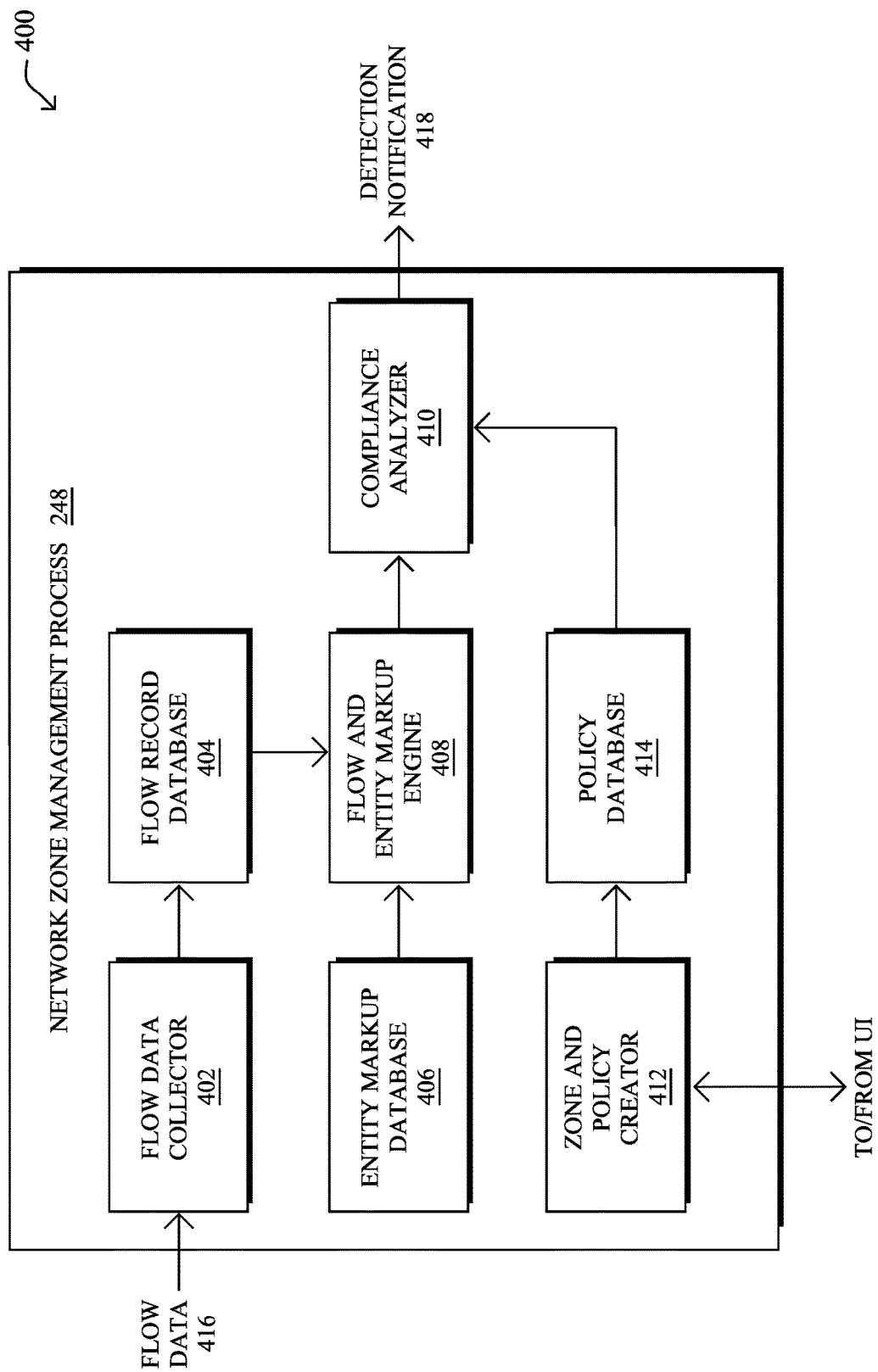
FIG. 4 illustrates an example architecture for implementing cryptographic policies for security zones in a network.

FIG. 4 illustrates an example architecture 400 for implementing cryptographic policies for security zones in a network, according to various embodiments. For example, architecture 400 may be used to implement security process 302 described previously. As shown, network zone management process 248 may include any number of sub-processes and/or may access any number of memory locations. As would be appreciated, these sub-processes and/or memory locations may be located on the same device or implemented in a distributed manner across multiple devices, the combination of which may be viewed as a single system/device that executes network zone management process 248. Further, while certain functionalities are described with respect to the sub-processes and memory locations, these functions can be added, removed, or combined as desire, in further implementations.

During operation, network zone management process 248 may include a flow data collector 402 that receives flow data 416 from any number of network telemetry sources regarding an observed traffic flow in the network. For example, flow data collector 402 may receive Netflow or IPFIX records from one or more telemetry devices in the network. In various cases, flow data collector 402 may receive flow data 416 on a pull basis (e.g., in response to explicitly requesting flow data 416) or on a push basis (e.g., the telemetry source sends flow data 416 to flow data collector 402 unprompted). In various embodiments, flow data collector 402 may correlate and synthesize the flow data 416 from different telemetry sources into a single data record that include the relevant data elements defining the end-to-end client-to-server "network flow." In turn, flow data collector 402 may store the resulting record in a flow record database 404, the contents of which describe what has been happening in the network.

By way of example, a flow record generated by flow data collector 402 for an observed traffic flow may include any or all of the following information:

TABLE 1

| Attribute | Value |
| --- | --- |
| Client IP | 10.1.1.2 |
| Server IP | 10.2.2.2 |
| Client Port | 45678 |
| Server Port | 80 |
| IP Protocol | TCP |
| Client Bytes | 456 |
| Server Bytes | 34323 |
| Encryption Version | TLS 1.2 |
| Encryption Key Exchange | ECDHE |
| Encryption Type | AES_128_GCM/128 |
| Encryption Authentication Type | RSA |
| Encryption MAC | SHA256 |
| . . . | |
| Start Time | 12:00:00 |
| End Time | 12:01:00 |

In various embodiments, network zone management process 248 may also include a zone and policy creator 412 that functions to create network zones and define acceptable cryptographic policies between the zones. In one embodiment, as shown, zone and policy creator 412 may communicate with a user interface (UI), to present data to an administrator (e.g., via an electronic display) and receive input from the administrator. In another embodiment, zone and policy creator 412 may receive input from another device or system in the network using an object definition import mechanism.

By way of example, zone and policy creator 412 may receive an indication that one or more identifiers for entities are to belong to the same network zone. In many implementations, the identifier may be a device identifier, such as an IPv4 address, IPv6 address, or MAC address. However, in further implementations, an entity can also be represented as a user identifier logged into a particular device, session, or application. Similarly, zone and policy creator 412 may receive an indication of an inter-zone policy that includes the acceptable cryptographic parameters for traffic between two or more zones.

Based on the received input from the UI and/or from an object definition import mechanism, zone and policy creator 412 may populate an entity markup database 406 with the device identifiers and their zone assignments. In a similar manner, zone and policy creator 412 may populate policy data 414 with the specified inter-zone policies to be applied to these zones. Note that a given policy may be applied to a single zone or may be assigned to multiple zones at once. For example, an inter-zone policy may be applicable to traffic flows between zones A and B, between zone A and zones A-B, between zone A and all other zones, or the like.

In further embodiments, network zone management process 248 may include a flow and entity markup engine 408 that may operate to associate flow records in flow record database 404 with the information in entity markup database 406. More specifically, flow and entity markup engine 408 may match the entities and zones in entity markup database 406 to the corresponding flow records in flow record database 404. For example, flow and entity markup engine 408 may match IP address entries in flow record database 404 and entity markup database 406, to associate the captured flow data in flow record database 404 with a security zone in entity markup database 406. In turn, in some embodiments, flow and entity markup engine 408 may insert the zone definition into the active (and future) flow records involving that IP address.

Network zone management process 248 may also include a compliance analyzer 410 that is configured to take as input a defined policy in policy database 414 for a given zone in which an entity resides, as identified by flow and entity markup engine 408. In turn, compliance analyzer 410 may determine whether the parameters found in the flow record(s) for the entity comply with the policy. If not, compliance analyzer 410 may generate and send a detection notification 418 to another system or device. For example, in some cases, detection notification 418 may be sent to the UI from which zone and policy creator 412 received the policy. In another example, detection notification 418 may be sent to another process to automatically take a mitigation action, such as blocking the traffic flow or future traffic flows associated with the entity.

Any number and/or combinations of cryptographic parameters may be included in a policy in policy database 414. In particular, a given policy may specify a cryptographic parameter set that indicates any number of allowed, or disallowed, cryptographic parameters such as ciphersuites, key lengths, or other options that may be discernable from the observed traffic flow.

For example, in TLS, over three hundred combinations of cryptographic parameters can be used as part of a policy in policy database 414. Roughly speaking, each ciphersuite corresponds to a Cartesian product of hash types, signature types, encoding types, authentication types, and key exchange types that are currently possible. These are summarized in Table 2 below:

TABLE 2

| | |
|---|---|
| Hash | SHA, NULL, SHA256, SHA384, MD5 |
| Signature | KRB5, PSK, SRP_SHA, RSA-KT, DSS, SRP_SHA_RSA, RSA, anon, NULL, ECDSA |
| Encoding | ARIA_128_GCM, DES_CBC, ARIA_128_CBC, CAMELLIA_256_GCM, AES_128_CCM, CAMELLIA_128_GCM, 3DES_EDE_CBC, DES40_CBC, ARIA_256_GCM, SEED_CBC, RCA_128, NULL, CAMELLIA_256_CBC, ARIA_256_CBC, RC4_40, RC2_CBC_40, AES_256_GCM, IDEA_CBC, AES_128_CCM_8, AES_128_CBC, AES_256_CCM, CHACHA20_POLY1305, AES_256_CBC, AES_128_GCM, CAMELLIA_128_CBC, AES_256_CCM_8 |
| Authentication | AES_256_GCM, NULL, AES_256_CCM, CHACHA20_POLY1305, AES_128_CCM_8, ARIA_128_GCM, AES_256_CCM_8, CAMELLIA_256_GCM, AES_128_CCM, CAMELLIA_128_GCM, AES_128_GCM, ARIA_256_GCM, HMAC |
| Key Exchange | KRB5, PSK, DH, SRP_SHA, ECDH_anon, DHE, ECDH, RSA, SRP_SHA_RSA, ECDHE, DHE_PSK, NULL, DHA_anon |

In this model, Signature represents the mechanism by which the server authenticates itself to the client. The Authentication parameter represents the mechanism used for message authentication which, for Authenticated Encryption with Associated Data (AEAD) algorithms is identified with that algorithm. Otherwise, HMAC is used with the cryptographic hash function specified by the hash parameter.

In a typical TLS session, the following information may be captured in the telemetry data regarding the flow:

The selected ciphersuite—from which all of the parameters in Table 2 above can be determined.

Client key length—the length of the clientKeyExchange field in bits.

ECC group—the ECC group used, and for each server certificate.

Signature algorithm—the algorithm used in the certificate.

Signature key size—the number of bits in the signing key.

In some embodiments, these five observable parameters may form a "cryptographic parameter set." In turn, zero or more cryptographic parameter sets may be mapped to an entity definition via policy. For example the below would be the cryptographic zone definition for a "critical server:"

```
{
   "Critical Server":{
      "IP Address": "10.1.1.10",
      "tls sets": {
         "scs": "c02f",
         "client_key_length": 512,
         "server_cert": [
            {
               "signature_key_size": 2048,
               "signature_algorithm": "sha256WithRSAEncryption"
            }, {
               "signature_algorithm": "sha256WithRSAEncryption"
            },
            {
```

```
        "signature_key_size": 1024,
        "signature_algorithm": "sha1WithRSAEncryption"
        }
      ]
    }
  }
}
```

In the above example, the ciphersuite hex code c02f is TLS ECDHE RSA WITH AES 128 GCM SHA256. This particular example has a chain of two certificates (issued by GeoTrust) deemed good, followed by a weak one (issued by Equifax).

The above example is one such instantiation relying on the creation of cryptographic zones from parameter sets reported in telemetry. However, in the case of TLS v1.3, it may not be possible to infer the complete parameter set solely from the telemetry, because the ciphersuite in TLS v1.3 is encrypted in the server hello. However, in some embodiments, the ciphersuite could still be inferred from a combination of passive observations (multiple observations of many flows), along with active probing and caching of server behavior and the cryptographic zone created from the inference.

In turn, a cryptographic policy herein may dictate which TLS communications are allowed across the cryptographic zones defined above. Notably, once a cryptographic zone is defined, the cryptographic parameter sets defined for the zone may be treated as either the allowable or disallowable cryptographic parameter sets for that zone. When applied in relation to other zones, such as with respect to inter-zone traffic, the parameter sets for the zone may indicate the allowable or disallowable cryptographic parameter sets that can be used.

Either through an automated or manual process, a policy between zones can be created. For example, once a cryptographic zone is defined, a policy may be defined to generate an alarm whenever a cryptographic parameter set that is not in the defined list for that zone is observed in certain traffic. Thus, when compliance analyzer 410 determines that a policy in policy database 414 has been violated, it may generate a detection notification 418 to cause the performance of a mitigation action. Alternatively, the cryptographic policy can be used to monitor the allowed cryptographic communication between zones and alarm when there are deviations from the defined policy.

In addition, a cryptographic policy could provide a "reason code" that describes why a session is non-compliant. Such a code may be included in detection notification 418, in some cases. For example if a weak cryptographic parameter set was used, a reason code could indicate that the use of a weak parameter set was detected in the network traffic. If the cryptographic parameter zones were designed around certain requirements, such as the Payment Card Industry' (PCI) encryption requirements, and the parameter set in use by the traffic is not part of the PCI standard, a reason code would indicate that the communication is not PCI compliant.

The reason code generated by compliance analyzer 410 could also be based on other telemetry contained within the flow record entity. For example, if the entity is an endpoint, information such a device type may be present in the flow record. In turn, if a host was using RC4 and was identified as a windows XP host, the reason code could indicate that an old, non-compliant host was present in the cryptographic zone.

Figure 5:
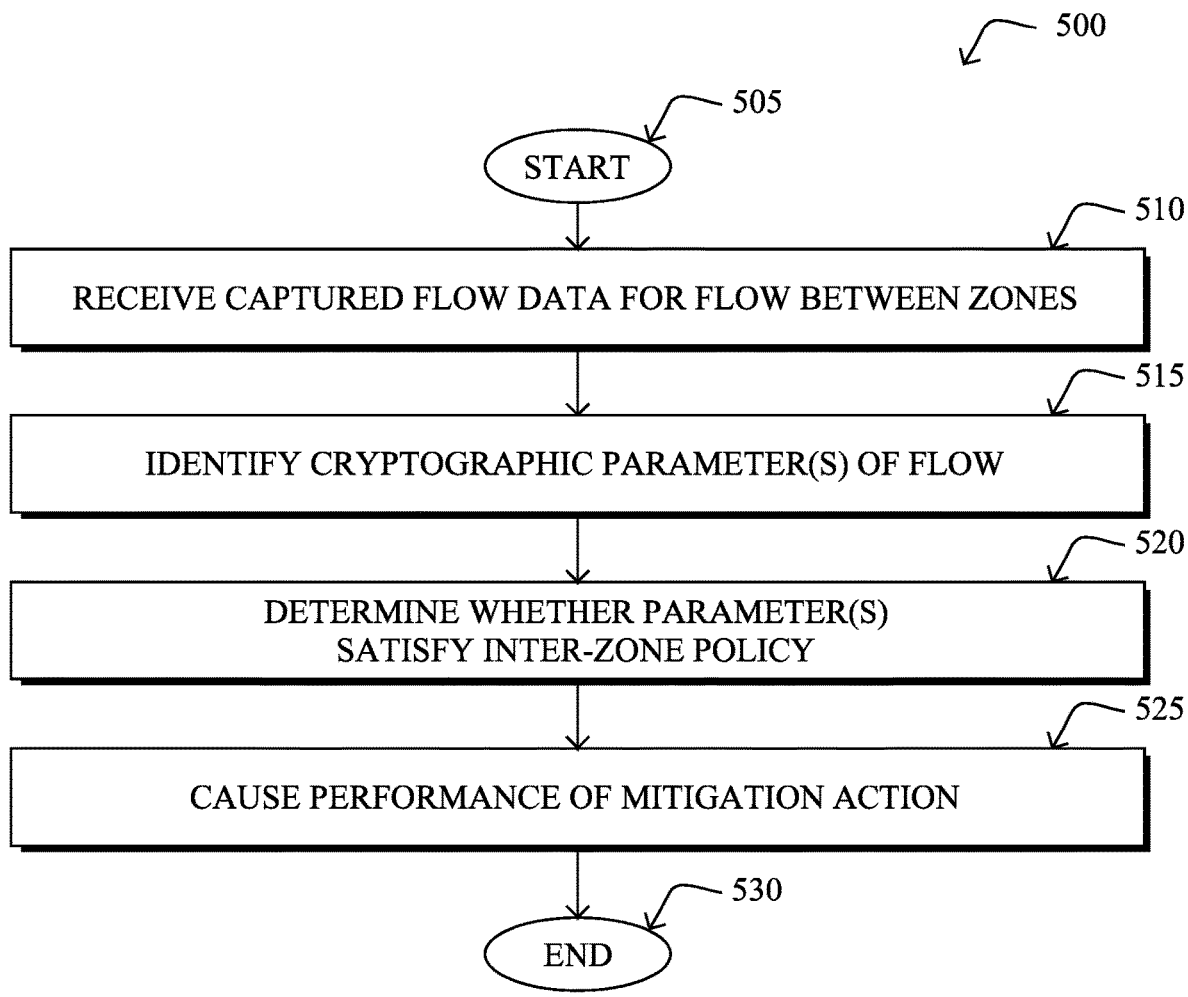
FIG. 5 illustrates an example simplified procedure for applying a cryptographic policy to a network traffic flow between zones in a network.

FIG. 5 illustrates an example simplified procedure 500 for applying a cryptographic policy to a network traffic flow between zones in a network, in accordance with one or more embodiments described herein. For example, a non-generic, specifically configured device (e.g., device 200) may perform procedure 500 by executing stored instructions (e.g., process 248), to implement a security service in a network. The procedure 500 may start at step 505, and continues to step 510, where, as described in greater detail above, the service may receive captured flow data regarding a traffic flow sent via the network between a first device assigned to a first network zone and a second device assigned to a second network zone. Notably, this flow data may include telemetry data captured regarding the flow (e.g., addresses, ports, timing information, etc.) and, if the flow is encrypted, the cryptographic parameters used by the flow.

At step 515, as detailed above, the service may identify one or more cryptographic parameters of the flow from the captured flow data. For example, analysis of a TLS header used in the flow may indicate the hash type, signature type, encoding type, authentication type, and key exchange type used by the flow. Further cryptographic parameters may indicate the ciphersuite in use, key length information (e.g., the client key length, the signature key length, etc.), or any other information regarding the encryption of the traffic flow.

At step 520, the service may determine whether the one or more cryptographic parameters of the traffic flow satisfy an inter-zone policy associated with the first and second network zones, as described in greater detail above. For example, the policy may specify that traffic between the first and second zones cannot use a client key under a specified number of bits.

At step 525, as detailed above, the service may cause the performance of a mitigation action in the network, when the one or more cryptographic parameters of the traffic flow do not satisfy the inter-zone policy associated with the first and second network zones. In various cases, this may entail generating and sending an alert (e.g., to a UI for review) or even taking automated measures, such as blocking the traffic flow or future traffic flows associated with the first and/or second devices. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow cryptographic parameters of traffic flows to be used to define and enforce policies between configurable zones in a network. In some aspects, the policy may require the use of certain hashes, key exchanges, ciphersuites, etc. between zones. If a policy violation is detected in an inter-zone traffic flow, mitigation actions can then be taken to address the policy violation.

While there have been shown and described illustrative embodiments that provide for a cryptographic security audit mechanism that uses network service zone locking, it is to be understood that various other adaptations and modifications may be made within the spirit and scope of the embodiments herein. For example, while certain embodiments are described herein with respect to using certain cryptographic parameters, the parameters highlighted herein are not limited as such and other cryptographic parameters may be used in a policy, as desired. Further, while certain protocols are described herein, such as TLS, other suitable protocols can also be used with the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a service, captured traffic flow data regarding a traffic flow sent via a network between a first device assigned to a first network zone and a second device assigned to a second network zone;
identifying, by the service and from the captured traffic flow data, one or more cryptographic parameters of the traffic flow;
determining, by the service, whether the one or more cryptographic parameters of the traffic flow satisfy an inter-zone policy associated with the first and second network zones;
causing, by the service, performance of a mitigation action in the network when the one or more cryptographic parameters of the traffic flow do not satisfy the inter-zone policy associated with the first and second network zones;
providing, by the service and to a user interface, a listing of cryptographic parameters observed in the network; and
receiving, at the service, the inter-zone policy from the user interface, after providing the listing of cryptographic parameters to the user interface.

2. The method as in claim 1, wherein the mitigation action comprises one of: sending an alert via the network or blocking the traffic flow.

3. The method as in claim 1, wherein the first network zone is located in a local area network (LAN) and the second network zone is located outside of the LAN.

4. The method as in claim 1, wherein the first and second network zones are located in the same local area network (LAN).

5. The method as in claim 1, wherein the one or more cryptographic parameters comprise at least one of: a cyphersuite or key length used in the traffic flow.

6. The method as in claim 5, wherein the cyphersuite represents a particular combination of hash type, signature type, encoding type, authentication type, and key exchange type.

7. The method as in claim 5, wherein the key length comprises a signature key size or client key size used in the traffic flow.

8. The method as in claim 1, further comprising:
determining, by the service, that the first device is associated with the first zone based on an Internet Protocol (IP) address of the first device.

9. An apparatus, comprising:
one or more network interfaces to communicate with a network;
a processor coupled to the network interfaces and configured to execute one or more processes; and
a memory configured to store a process executable by the processor, the process when executed configured to:
receive captured traffic flow data regarding a traffic flow sent via a network between a first device assigned to a first network zone and a second device assigned to a second network zone;
identify, from the captured traffic flow data, one or more cryptographic parameters of the traffic flow;
determine whether the one or more cryptographic parameters of the traffic flow satisfy an inter-zone policy associated with the first and second network zones;
cause performance of a mitigation action in the network when the one or more cryptographic parameters of the traffic flow do not satisfy the inter-zone policy associated with the first and second network zones;
provide, to a user interface, a listing of cryptographic parameters observed in the network; and
receive the inter-zone policy from the user interface, after providing the listing of cryptographic parameters to the user interface.

10. The apparatus as in claim 9, wherein the mitigation action comprises one of: sending an alert via the network or blocking the traffic flow.

11. The apparatus as in claim 9, wherein the first network zone is located in a local area network (LAN) and the second network zone is located outside of the LAN.

12. The apparatus as in claim 9, wherein the first and second network zones are located in the same local area network (LAN).

13. The apparatus as in claim 9, wherein the one or more cryptographic parameters comprise at least one of: a cyphersuite or key length used in the traffic flow.

14. The apparatus as in claim 13, wherein the cyphersuite represents a particular combination of hash type, signature type, encoding type, authentication type, and key exchange type.

15. The apparatus as in claim 13, wherein the key length comprises a signature key size or client key size used in the traffic flow.

16. The apparatus as in claim 9, wherein the process when executed is further configured to:
determine, that the first device is associated with the first zone based on an Internet Protocol (IP) address of the first device.

17. The apparatus as in claim 9, wherein the apparatus is an intermediate networking device between the first and second entities.

18. A tangible, non-transitory, computer-readable medium storing program instructions that cause a device to execute a process comprising:
receiving captured traffic flow data regarding a traffic flow sent via a network between a first device assigned to a first network zone and a second device assigned to a second network zone;
identifying, from the captured traffic flow data, one or more cryptographic parameters of the traffic flow;
determining whether the one or more cryptographic parameters of the traffic flow satisfy an inter-zone policy associated with the first and second network zones; and
causing performance of a mitigation action in the network when the one or more cryptographic parameters of the traffic flow do not satisfy the inter-zone policy associated with the first and second network zones;

providing, to a user interface, a listing of cryptographic parameters observed in the network; and receiving the inter-zone policy from the user interface, after providing the listing of cryptographic parameters to the user interface.

19. The tangible, non-transitory, computer-readable medium as in claim 18, wherein the one or more cryptographic parameters comprise at least one of: a cyphersuite or key length used in the traffic flow.

20. The tangible, non-transitory, computer-readable medium as in claim 19, wherein the cyphersuite represents a particular combination of hash type, signature type, encoding type, authentication type, and key exchange type.

* * * * *